United States Patent [19]

Kokkonen et al.

[11] Patent Number: 4,795,170
[45] Date of Patent: Jan. 3, 1989

[54] PACKING ARRANGEMENT FOR SEALING THE SURFACE OF A ROTARY DRUM LIKE OBJECT

[75] Inventors: Seppo Kokkonen; Harri Qvintus; Erkki Ruuskanen, all of Savonlinna, Finland

[73] Assignee: Enso-Gutzeit OY, Helsinki, Finland

[21] Appl. No.: 919,884

[22] Filed: Oct. 15, 1986

[51] Int. Cl.$^4$ .............................................. F16J 15/18
[52] U.S. Cl. ................... 277/106; 277/147; 277/178; 277/97
[58] Field of Search ..................... 277/12, 32, 50, 81 S, 277/97–99, 105, 106, 112, 147–151, 163, 178, 183, 192, 195, 197, 199

[56] References Cited

U.S. PATENT DOCUMENTS

| | | | |
|---|---|---|---|
| 731,304 | 6/1903 | Howe | 277/197 X |
| 1,565,632 | 12/1925 | Fish | 277/106 X |
| 2,469,078 | 5/1949 | Robison | 277/148 |
| 2,635,932 | 4/1953 | Heusser | 277/192 |
| 3,259,358 | 7/1966 | Tripoli | 277/147 X |
| 3,567,232 | 3/1971 | Rickerson | 277/148 |
| 3,747,943 | 7/1973 | Dietzel et al. | 277/97 X |
| 4,406,464 | 9/1983 | Schymura | 277/178 X |
| 4,408,769 | 10/1983 | Wolff | 277/178 X |

FOREIGN PATENT DOCUMENTS 1027024 3/1958 Fed. Rep. of Germany .
2460456 6/1976 Fed. Rep. of Germany .

Primary Examiner—Robert S. Ward
Attorney, Agent, or Firm—Toren, McGeady & Associates

[57] ABSTRACT

A packing arrangement for sealing the outer surface of a rotary, drum-like object, such as a washer used in manufacturing cellulose, with a non-rotating annular packing, which is most advantageously composed of one or several side-by-side packing fillets, e.g. braided packings, the arrangement including a circular packing body which together with the rotating drum surface, defines a space in which the packings have been installed. The drawback encountered in existing arrangements is wear of the packing, and consequent leakage. In the packing arrangement of the invention, this has been solved in that the packing body is, at least in its radial direction, elastically supported so that, as the drum-like object rotates, the packings yield to the movements of the drum surface arising from radial displacements of the drum.

5 Claims, 1 Drawing Sheet

PACKING ARRANGEMENT FOR SEALING THE SURFACE OF A ROTARY DRUM LIKE OBJECT

BACKGROUND OF THE INVENTION

1. Field of the Invention

The present arrangement concerns a packing arrangement for sealing, with a non-rotating annular packing, the surface of a rotary drum-like object, such as a washing drum used in cellulose manufacturing, said packing being most advantageously composed of one or several side-by-side packing fillets, e.g. braided packings, such arrangement comprising a circular packing body which, together with the rotating drum surface, defines a space in which the packings have been installed.

2. Description of Related Art

In present art, braided packings of this type are tightened to appropriate tightness with the aid of a spider ring attached with a screw to the packing body. When the screw is tightened, the box cords are increasingly compressed in the packing box and act on the surface of the rotating drum with greater force. When the tightness is appropriate, the packing operates fairly well as long as there are no configurational inaccuracies of the drum surface, e.g. owing to manufacturing defects or thermal expansion phenomena. If the rotation of the drum is even slightly eccentric, for istance owing to shaft off-set, friction forces of different magnitude act on the packing at different points and the packig suffers abnormal wear. Furthermore, this gives rise to an extra torque component. As a consequence of its wear, the packing begins to leak over the course of time. Such leakage can be temporarily stopped by tightening the packing, but this clearly also entails an even further increase of the friction forces and the packing suffers still worse wear, causing the leakage to eventually increase. Thus, the packing becomes unfit for use in a relatively short time, and it must be replaced. Apart from the wear experienced by the packing, the surface which the packing contacts is also abraded when the tightening is increased.

Traditionally, the thickness of the packing fillet is dimensioned in relation to the diameter of the sealing surface. In the packing instruction, the ratio between the thickness of the packing and the diameter of the sealing surface should be greater than 0.1. When this condition is met, the resilience of the packing material will eliminate the above-mentioned inaccuracies in manufacture as well as other deformations and thermal expansion effects. It is, however, not sensible in practice to construct packings thick enough for large diameters that have to be sealed off, because their manufacturing would be exceedingly expensive.

THE OBJECT OF THE INVENTION

The object of the present invention is to provide a packing arrangement which is free of problems of the kind discussed above. The packing arrangement of the invention is therefore characterized in that the packing body is elastically supported, at least in its radial direction so that as the drum-like object rotates, the packings adjust to the movements of the drum surface which cause radial displacements of the drum.

An advantageous embodiment of the invention is characterized in that elastic centering members are mounted on the packing body which center the packing body radially, and upon the packing body an elastic fixing member, e.g. an elastic rod, which takes up the weight of the packing body so that the friction forces will be minimized.

Another advantageous embodiment of the invention is characterized in that rods are mounted on opposite sides of the periphery of the packing body, which take up the friction torque produced in the packing body by the rotation of the drum.

Still another advantageous embodiment of the invention is characterized in that the rods are spring-loaded in their axial direction.

Still another advantageous embodiment of the packing arrangement of the invention is characterized in that the packing body is attached to the machine frame with axially spring-loaded fixing screws, the diameter of the holes provided in the packing body for these screws having been made substantially larger than the diameter of the fixing screw, in order to allow radial movement of the packing body.

Among the major advantages afforded by the design of the invention are that the packing does not wear down not nearly as greatly as it does in designs of the prior art because the packing is able to yield to any inaccuracies which may be present in the rotation of the drum and that the torque arising from friction forces which acts on the packing body is substantially constant in the design of the invention.

BRIEF DESCRIPTION OF THE DRAWING

In the following, the invention is described in detail with the aid of embodiment examples, referring to the attached drawing, wherein.

DETAILED DESCRIPTION OF THE PREFERRED EMBODIMENT

Figure 1:
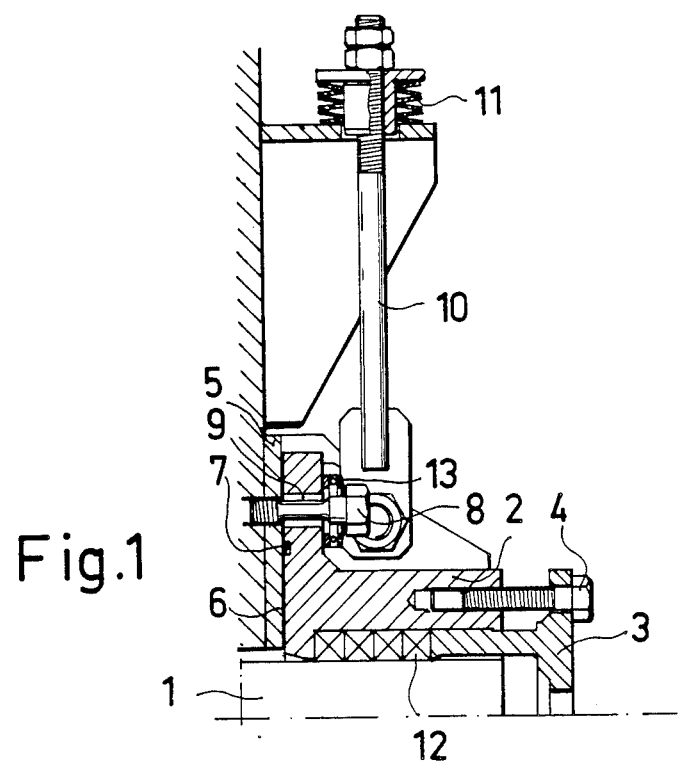
FIG. 1 presents a section carried along the line I—I in FIG. 2.

The purpose of the invention, in the example which is now being considered, is to seal the end face of a cellulose pressure washer. The washer comprises a rotary washing drum 1, which is sealed with non-rotating annular packing fillets 12, of which there may be a plurality arranged side by side, their number being four in the present example. The packing fillets 12, most advantageously so-called box cords, are disposed in a space which is defined by the surface of the rotating drum 1, the packing body 2 and the spider ring 3 attached thereto with screws 4. When the screws 4 are tightened, the spider ring 3 is urged against the packing 12, and it is thus possible with this arrangement to adjust the tightness of the packing to be appropriate for the particular application.

The packing body 2, and naturally also the spider ring 3 attached thereto, is suspended from the rod 10, this rod being spring-loaded, e.g. with cup spring 11. The springs 11 permits, most advantageously, a movement of about −5 to +5 mm of the packing body 2. The spring force is so dimensioned that it equals the weight of the packing body 2 together with the parts attached thereto.

The packing body 2 is fixed in the axial direction of the drum 1 to the machine frame 5 with spring-loaded screws 8. A gap 6 which is left between the machine frame 5 and the packing body 2 is sealed over its entire length with a packing 7, which seals the process statically against the atmosphere, yet permitting movements of the packing body relative to the machine frame. This has been rendered possible in that the holes 9 provided in the packing body for the screws 8 have been made larger than the diameter of each of the screws 8 and at each of holes 9. A permanent clearance is therefore present between the screws 8 and holes 9.

Figure 2:
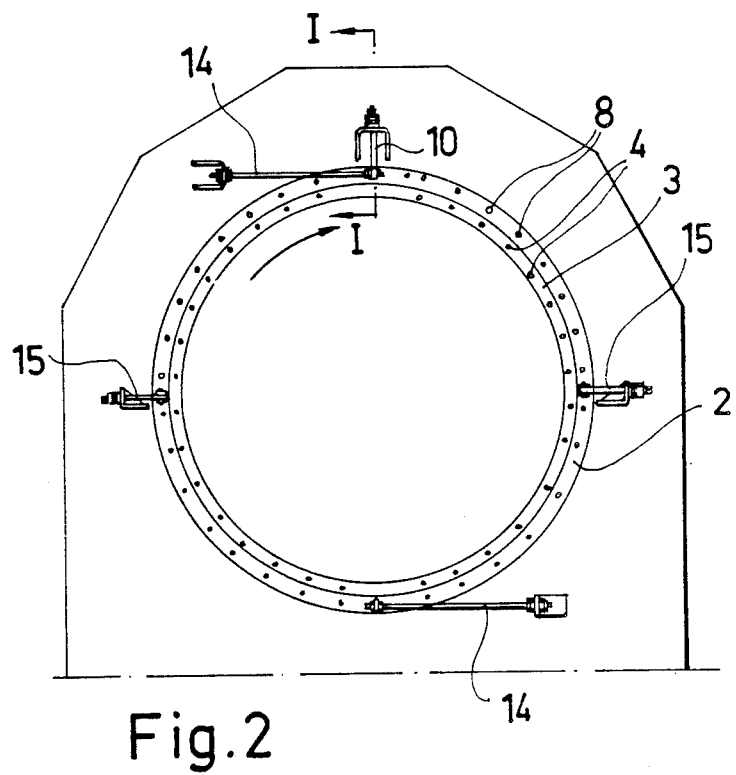
FIG. 2 presents, in end view, a packing arrangement according to the invention.

In FIG. 2, the packing arrangement of the invention is depicted as seen from one end. Spring loaded centering members 15, are mounted on both sides of the packing body 2 which cause the packing body to be properly centered laterally, yet permitting −5 to +5 mm lateral displacement. The design of these centering members 15 may be similar to that of the previously mentioned rod 10 fitted with cup springs 11.

For taking up the friction forces arising from the rotation of the drum 1, substantially tangential rods 14 are mounted, on opposite sides, on the periphery of the packing body 2, these rods 14 too, most advantageously, bring spring-loaded.

It is achieved, by a packing arrangement such as has been described, that when the drum 1 is rotating, the packing 12 may move in conformity with any inaccuracies inherent in the rotation, because the packing body 2 will yield.

It is obvious to a person skilled in the art that the invention is not confined to the embodiment examples presented in the foregoing, and that it may be varied within the scope of the claims following below. For instance, the machine on which the packing arrangement is applied need not necessarily be a cellulose washer, as was the case in this example: any other similar object that has to be sealed may equally be contemplated.

We claim:

1. A packing arrangement for sealing the outer surface of a washer drum, used in manufacturing cellulose, with a non-rotating annular packing, which is composed of side-by-side packing fillets, said arrangement comprising a circular packing body which, together with the rotating drum surface, defines a space in which the packings are installed, wherein the packing body is elastically supported so that, as the drum rotates, the packings yield to the movements of the drum surface arising from radial displacements of the drum, and wherein elastic centering members are mounted on the packing body for centering the packing body radially, and an elastic fixing member is also mounted on the packing body for taking up the weight of the packing body so that friction forces are maintained.

2. Packing arrangement according to claim 1, wherein rods are mounted on opposite sides of the periphery of the packing body for taking up friction-induced torque produced in the packing body by the rotation of the drum.

3. Packing arrangement according to claim 2, wherein the rods are spring-loaded in their axial direction.

4. Packing arrangement according to claim 1, wherein the packing body is attached to the machine frame by fixing screws which are spring-loaded in their axial direction, the diameter of holes made in the packing body for the fixing screws being substantially larger than the diameter of the fixing screws, in order to allow radial movement of the packing body.

5. Packing arrangement according to claim 1, where a circular gap is arranged between the packing body and the machine frame, and a packing is disposed over the entire length of said circular gap for isolating the process statically from the atmosphere.

* * * * *

UNITED STATES PATENT AND TRADEMARK OFFICE
CERTIFICATE OF CORRECTION

PATENT NO. : 4,795,170

DATED : January 3, 1989

INVENTOR(S) : Seppo Kokkonen et al

It is certified that error appears in the above-identified patent and that said Letters Patent is hereby corrected as shown below:

On the title page, the following should be added.

[30] Foreign Application Priority Data

October 28, 1985  Finland ........ 854232

Signed and Sealed this

Thirteenth Day of June, 1989

Attest:

DONALD J. QUIGG

*Attesting Officer*    *Commissioner of Patents and Trademarks*